(12) United States Patent
Shajenko et al.

(10) Patent No.: US 8,601,025 B1
(45) Date of Patent: Dec. 3, 2013

(54) TECHNIQUES USING A BIDIRECTIONAL GRAPH FOR REPORTING TO CLIENTS

(75) Inventors: Peter Shajenko, Merrimack, NH (US); Kevin Labonte, Upton, MA (US); Deene Dafoe, Northborough, MA (US); Yuanyang Wu, Shanghai (CN); Ashish Kamra, Karnatka (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/200,662

(22) Filed: Sep. 28, 2011

(51) Int. Cl.
*G06F 7/00* (2006.01)
*G06F 17/30* (2006.01)

(52) U.S. Cl.
USPC .......................................... 707/778; 707/720

(58) Field of Classification Search
None
See application file for complete search history.

(56) References Cited

U.S. PATENT DOCUMENTS

| | | | | |
|---|---|---|---|---|
| 4,829,427 A * | 5/1989 | Green | | 1/1 |
| 5,201,046 A * | 4/1993 | Goldberg et al. | | 1/1 |
| 5,940,819 A * | 8/1999 | Beavin et al. | | 1/1 |
| 6,195,653 B1 * | 2/2001 | Bleizeffer et al. | | 1/1 |
| 6,509,898 B2 * | 1/2003 | Chi et al. | | 345/440 |
| 6,519,592 B1 * | 2/2003 | Getchius et al. | | 1/1 |
| 6,654,753 B1 * | 11/2003 | Arda et al. | | 707/798 |
| 6,934,699 B1 * | 8/2005 | Haas et al. | | 1/1 |
| 7,003,559 B1 * | 2/2006 | Natarajan et al. | | 709/223 |
| 7,913,209 B1 * | 3/2011 | Wu et al. | | 716/106 |
| 7,962,672 B1 * | 6/2011 | Martin et al. | | 710/38 |
| 2002/0042791 A1 * | 4/2002 | Smith et al. | | 707/5 |
| 2004/0098486 A1 * | 5/2004 | Gu et al. | | 709/228 |
| 2004/0193607 A1 * | 9/2004 | Kudo et al. | | 707/9 |
| 2005/0050010 A1 * | 3/2005 | Van der Linden | | 707/3 |
| 2006/0074870 A1 * | 4/2006 | Brill et al. | | 707/3 |
| 2006/0085412 A1 * | 4/2006 | Johnson et al. | | 707/4 |
| 2007/0208693 A1 * | 9/2007 | Chang et al. | | 707/2 |
| 2007/0209075 A1 * | 9/2007 | Coffman | | 726/23 |
| 2008/0114717 A1 * | 5/2008 | Jones et al. | | 707/1 |
| 2008/0114803 A1 * | 5/2008 | Chinchwadkar et al. | | 707/102 |
| 2008/0215580 A1 * | 9/2008 | Altinel et al. | | 707/5 |
| 2008/0313366 A1 * | 12/2008 | Sagi | | 710/38 |
| 2009/0037500 A1 * | 2/2009 | Kirshenbaum | | 707/206 |
| 2009/0055432 A1 * | 2/2009 | Smith et al. | | 707/103 R |
| 2009/0119279 A1 * | 5/2009 | Goyal et al. | | 707/5 |

(Continued)

FOREIGN PATENT DOCUMENTS

EP 1890243 A2 * 2/2008

OTHER PUBLICATIONS

Query caching and optimization in distributed mediator systems, Adah et al, SIGMOD'96, pp. 137-184, 1996.*
The query-flow graph: Model and applications, Boldi et al, CIKM'08, pp. 609-617, 2008.*
Bidirectional Expansion for keyword search on graph database, Kacholia et al, Proceedings of the 31st VLDB Conference, Trondheim, Norway, 2005.*

(Continued)

*Primary Examiner* — Augustine K Obisesan
(74) *Attorney, Agent, or Firm* — Muirhead and Saturnelli, LLC

(57) ABSTRACT

Described are techniques for reporting requested information to a client. A bidirectional graph is stored in a cache. The bidirectional graph includes a first set of nodes and a second set of edges between pairs of nodes of the first set, each node of the first set representing an object in an object model of a server. Each edge of the second set between a pair of nodes of the first set represents an association between two objects corresponding to the pair of nodes. A request is received from the client. A response to the request is determined by traversing a portion of the bidirectional graph to extract first information, and filtering the first information in accordance with a usage context customized for the client.

20 Claims, 6 Drawing Sheets

(56) References Cited

U.S. PATENT DOCUMENTS

| | | | |
|---|---|---|---|
| 2011/0295841 A1* | 12/2011 | Sityon et al. | 707/722 |
| 2012/0054172 A1* | 3/2012 | Agrawal et al. | 707/713 |
| 2012/0072470 A1* | 3/2012 | Joseph | 707/812 |
| 2012/0158933 A1* | 6/2012 | Shetty et al. | 709/223 |

OTHER PUBLICATIONS

Using user access patterns for semantic query caching, Yao et al., LNCS, pp. 737-746, 2003.*

Path Dictionary: A New Access Method for Query Processing in Object-Oriented Databases, Lee et al, IEEE Transactions on Knowledge and Data Engineering, 10(3), May/Jun. 1998.*

Using Witness Generators to Support Bi-directional Update Between Object-Based Databases, Chang et al., pp. 196-207, PODS, 1995.*

A grap grammars based framework for querying graph-like data, Flesca et al, Data & Knowledge Engineering 59, pp. 652-680, 2006.*

Pertial ordered regular languages for graph queries, Flesca et al, Journal of Computer and System Scinces 70, pp. 1-25, 2005.*

\* cited by examiner

TECHNIQUES USING A BIDIRECTIONAL GRAPH FOR REPORTING TO CLIENTS

BACKGROUND

1. Technical Field

This application relates to techniques used in connection with responding to client requests and more particularly to determining responses using information represented using a bidirectional graph.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with data storage systems, or more generally any type of system acting as a server, a client, such as a host, may request information from the server. In connection with responding to the client request, the server may perform processing that includes performing multiple database queries which can be time consuming and use an undesirable amount of resources of the server. The server may perform such queries in response to each client request received. In particular, the amount of server resources consumed for responding to client requests by performing such queries on demand in response to each client request may be excessive in environments, for example, where there are multiple such clients and each of the multiple clients may issue a large number of requests to the server for information.

SUMMARY OF THE INVENTION

In accordance with one aspect of the invention is a method for reporting requested information to a client comprising: storing a bidirectional graph in a cache, the bidirectional graph comprising a first set of nodes and a second set of edges between pairs of nodes of the first set, each node of the first set representing an object in an object model of a server, each edge of the second set between a pair of nodes of the first set representing an association between two objects corresponding to the pair of nodes, wherein if a first edge of the second set is from a first node to a second node, the second set also includes a second edge from the second node to the first node; receiving a request from the client; and determining a response to the request, wherein said determining the response includes: traversing a portion of the bidirectional graph to extract first information; and filtering the first information in accordance with a usage context customized for the client. The bidirectional graph may be initially stored in the cache at a first point in time by performing a bulk query of a database to retrieve information identifying all occurrences of paths between the server and a plurality of clients providing access to storage devices and all occurrences of defined storage groups of storage devices accessible by the plurality of clients, said client being one of the plurality of clients. The database may store information about a topology of a data storage configuration including the plurality of clients and the server, wherein the server is a data storage system comprising a plurality of storage devices including storage provisioned for the plurality of clients. The request from the client may be a request for information about storage of the data storage system provisioned for the client. The client may be a host system providing a virtualized environment and having a plurality of virtual machines executing on the host system. The plurality of virtual machines may have applications executing thereon which have application data stored on provisioned storage of storage devices of the data storage system. The client may be an aggregator providing collective data storage management for a plurality of hosts. Each of the hosts may provide a virtualized environment and may have one or more virtual machines executing on said each host, each of the one or more virtual machines having an application executing in the context of said each virtual machine wherein the application has its application data stored on provisioned storage of storage devices of the data storage system. The usage context for the client which is the aggregator includes a set of initiator ports of the plurality of hosts managed by the aggregator. The bulk query of the database may include retrieving a path set of all paths between the plurality of clients and the data storage system. Each of the initiator ports of the client may be included in at least one of the paths of the path set and each of the paths in the path set may represent a path over which provisioned storage is accessible for at least one of the plurality of clients. The data storage system may use a first data model to represent information which describes the topology and which is stored in the database. The first data model may be different from a second data model used by the client, and wherein the request from the client may be requesting information on storage provisioned for the client. Each of the paths in the path set over which provisioned storage is accessible by at least one of the plurality of clients may be identified by a plurality of associated objects of the first data model. The associated objects may include objects representing an initiator port of a first of the plurality of clients, a target port of the data storage system, and a storage group including a set of one or more storage devices. Storage devices included in the storage group and included in the data storage system may be accessible over said each path by the first client. The data storage system may include a provider service using the bidirectional graph stored in the cache to determine the response for the request from the client, wherein said filtering may include applying the usage context for the client to determine a portion of the first information associated with any port of the set of initiator ports of the client. The request from the client may be for a list of storage devices accessible to the client through a target port set of one or more target ports of the data storage system, and the response to the request may identify the storage devices accessible to the client on a path including any initiator port of the set of initiator ports of the client and any target port of the target port set. The bidirectional graph may be traversed from a first node to a second node and from the second node to a third node when performing a first traversal for a first client request, and traversed from the third node to the second node and from the second node to the first node when performing a second traversal for a second client request. The bidirectional graph may be updated in response to operations modifying objects of the first data model of the database upon which information represented in the bidirectional graph is dependent. The bidirectional graph may be updated in response to any of a change, deletion or addition with respect to an object in the first data model upon which the bidirectional graph is dependent. Updating the bidirectional graph may include any of updating information about an existing node in the bidirectional graph, deleting an existing node from the bidirectional graph, adding a new node to the bidirectional graph, and adding or deleting an association between nodes of the bidirectional graph. The method may include sending the response to the client.

In accordance with another aspect of the invention is a computer readable medium comprising code stored thereon for reporting requested information to a client, the computer readable medium comprising code for: storing a bidirectional graph in a cache, the bidirectional graph comprising a first set of nodes and a second set of edges between pairs of nodes of the first set, each node of the first set representing an object in an object model of a server, each edge of the second set between a pair of nodes of the first set representing an association between two objects corresponding to the pair of nodes, wherein if a first edge of the second set is from a first node to a second node, the second set also includes a second edge from the second node to the first node; receiving a request from the client; and determining a response to the request, wherein said determining the response includes: traversing a portion of the bidirectional graph to extract first information; and filtering the first information in accordance with a usage context customized for the client. The bidirectional graph may be initially stored in the cache at a first point in time by performing a bulk query of a database to retrieve information identifying all occurrences of paths between the server and a plurality of clients providing access to storage devices and all occurrences of defined storage groups of storage devices accessible by the plurality of clients, said client being one of the plurality of clients. The database may store information about a topology of a data storage configuration including the plurality of clients and the server, wherein the server may be a data storage system comprising a plurality of storage devices including storage provisioned for the plurality of clients and wherein the request from the client may be a request for information about storage of the data storage system provisioned for the client.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
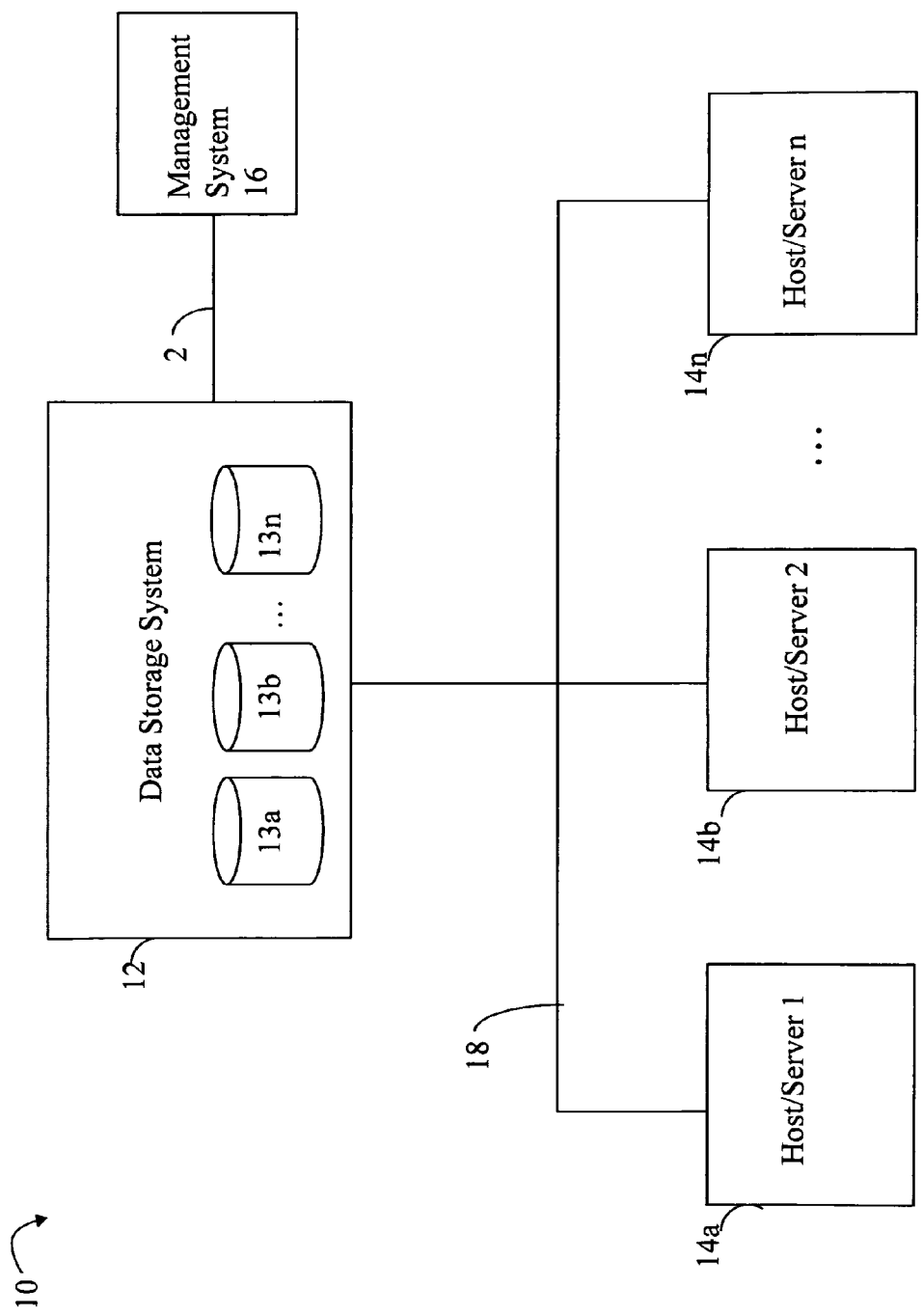
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
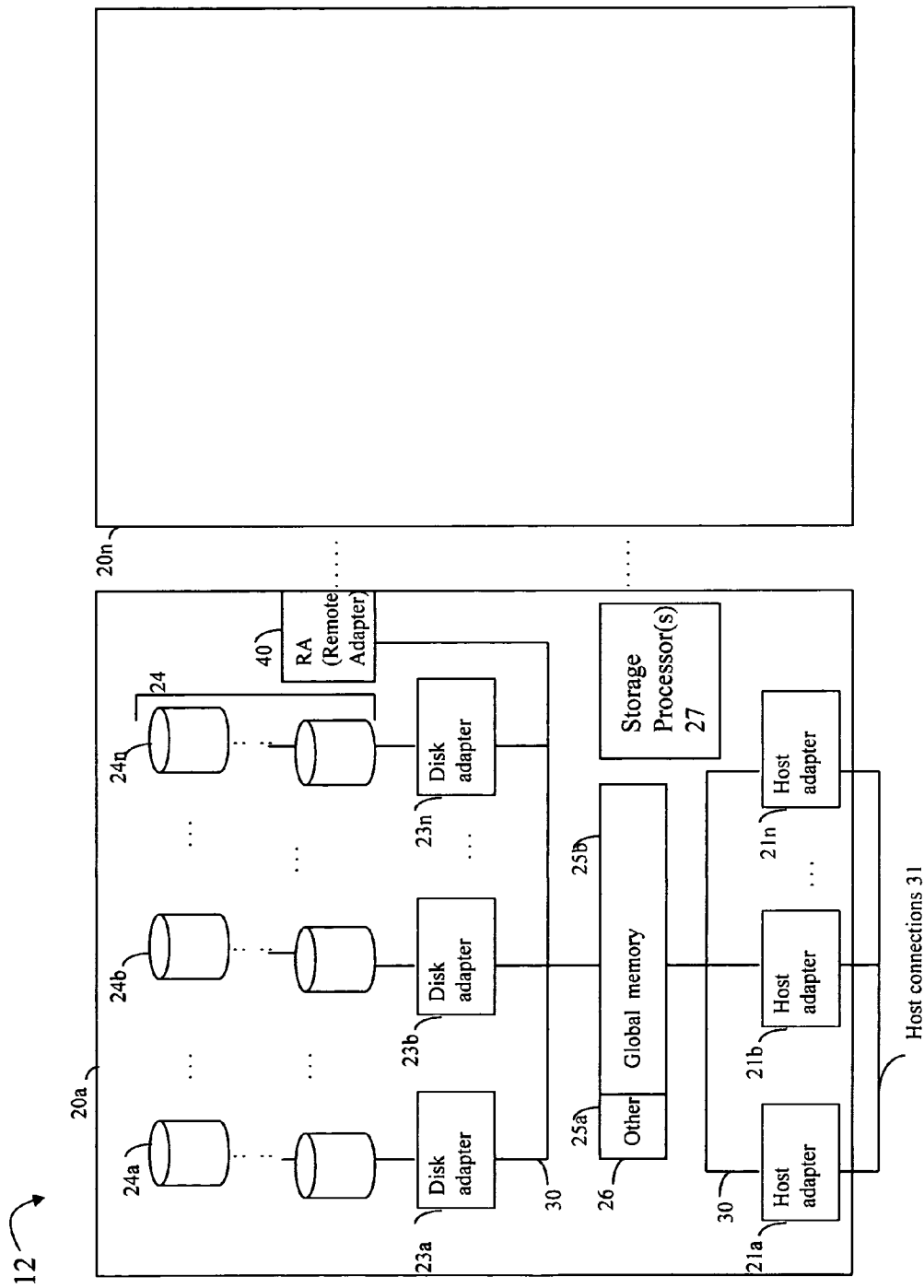
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26.

An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

In connection with description set forth herein, the host may be characterized in one aspect as a client of the data storage system having storage provisioned on the data storage system. The provisioned storage may include one or more LUNs that are accessible or visible to a host, or more generally any client of the data storage system, over one or more paths between the client and data storage system. Each path may be defined as including two endpoints, a first on the client and a second on the data storage system. The first endpoint on the client may be an initiator port of a component such as an HBA of the host used in connection with communicating with the data storage system such as to send I/O requests to store and/or retrieve data on provisioned devices of the data storage system. The second endpoint of the data storage system may be a target port of the data storage system such as a port of an FA of the data storage system used in connection with communicating with the client. A client may have access to one or more LUNs included in a defined storage group (SG). In the example described below, each initiator port may be configured to have access to LUNs of only a single SG. Each initiator port may be configured to have access to a set of one or more target ports of the data storage system through which all LUNs of the single SG are accessible or visible. The foregoing information regarding defined paths, SG definitions, what LUNs and SGs are accessible over what paths, and the like, may be included in a data storage system configuration or topology. Such topology may change over time as changes are made to an existing data storage system configuration, for example, by adding/removing hosts thereby adding/removing paths, adding/removing LUNs from existing SGs, adding/removing HBAs to existing hosts thereby adding/removing paths, and the like. Other embodiments utilizing techniques herein may have different restrictions and variations than that as provided herein in an exemplary embodiment for purposes of illustration.

In connection with a data storage system, system management may be performed using a server, such as a data storage system management service of the data storage system, and a client, such as using client management software executing on a host. Generally, the client may issue requests to the server for information used in connection with data storage system management. Such information may relate to, for example, existing data storage configuration or topology, health and status information of data storage system components, and the like. Information regarding the data storage system configuration or topology may include, for example, identifying all paths between a host and the data storage system over which provisioned storage is accessible or visible, identifying a particular host initiator port (e.g., of an HBA) and data storage system target port (e.g., of an FA of the data storage system) included in a path, identifying what one or more LUNs are accessible over one or more paths, identifying what one or more LUNs are accessible from a particular host initiator port, identifying what data storage system target ports are accessible to a host having one or more host initiator ports, identifying what host initiator ports may be used to access storage through a particular data storage system target port, identifying what target initiator ports may be used to access storage through a particular host initiator port, identifying paths that may be used to access a particular LUN, and the like. The particular information requested and utilized by the client may vary with the particular tasks the client performs at any point in time. The client may request an initial set of information from the server and then perform subsequent requests at later points in time, for example, to obtain information regarding any updates to the existing topology or configuration. Some examples of updates or changes are described above. Such updates may also include, for example, changes in connection with health or status of an existing component of the data storage system such as an indicator about whether a data storage system port is operable/can be used access LUNs.

In some embodiments, information regarding the topology or data storage configuration may be stored in a database of the data storage system. The database may be queried as needed in response to receiving a request from a client for information. One technique used in formulating information included in a response to a client request may perform database queries "on-demand" in response to each such client request received. However, such an on-demand technique may be inefficient in terms of server resources. For example, the server may use a first data model which may be characterized as complex and the client may use a second different data model. As an example, the server data model may use SGs and the client data model may have no corresponding entity. The server may be requested to return information to the client in terms of the client's second data model whereby the server extracts requested information from the server's first data model and may then further process the extracted information such as by reorganization, combining, and the like. In order to perform the foregoing, the server may have to perform multiple database queries to obtain a first set of information in terms of the first data model and then further filter the first set of information prior to returning a response to the client. Such filtering, as will be described in more detail below, may include presenting a subset of information customized in accordance with the client's particular usage or view. Furthermore, as the number of clients and requests from each client increases, the use of an on-demand technique is not readily scalable and may consume an undesirable and/or unacceptable amount of server resources. As such, an embodiment in accordance with techniques herein may utilize a cached bidirectional graph as described in more detail below in connection with responding to client requests.

In an exemplary embodiment described herein, the data storage system functioning as a server may use a first data model that is an object model including objects representing various entities in the topology for a current data storage system configuration and associations between pairs of such entities. An entity represented by an object of the first data model may be, for example, a LUN, a host initiator port, a data storage system target port, an SG, a path, and the like. Each object may also have one or more attributes describing properties of an object such as, for example, related to the health or status of a represented entity. For example, the first data model of the data storage system may include a first category or type of PATH object where an instance of the PATH object may be defined for each path in an existing topology or data storage system configuration from a host to the data storage system. Each PATH object instance may also indicate what SG is accessible through the represented path. As such, each PATH object may include information identifying a host initiator port and its object in the data storage system's model, a data storage system target port and its object in the data storage system's model, and an SG and its object in the data storage system's model whereby the SG is accessible over the path defined between the host initiator port and data storage system target port. The first data model (e.g., data storage system's data model) may also include a second category or type of LUN object. There may be a LUN object for each LUN of the data storage system where the LUN is provisioned storage for use by one of the hosts or other clients of the data storage system. Each LUN object instance may also indicate what SG includes the LUN. The client may query the server for information such as for the set of LUNs exposed or visible to the client from its set of host initiator ports. In this example, the client may use a second data model different from the first data model. For example, the client's data model does not include SGs or have an entity corresponding to SGs since the client only knows about LUNs exposed or accessible to initiator ports of the client. As such, a request from the client as noted above for all LUNs accessible to the client may require the server to extract information from its first data model related to one or more SG's to which particular client initiator ports belong, and then extract information from its data model regarding the particular LUNs of each such identified SG. The information of the first data model may be stored in a database having multiple tables representing the objects of the first data model and extracting the necessary information from the database to provide the requested information in response to the client query may include performing multiple complex database queries for each client request.

An embodiment in accordance with techniques herein may perform an initial bulk query request to obtain a complete set of information from the database where the complete set of information may be used to respond to all requests from all clients of the data storage system. In connection with the example embodiment described herein, the complete set of information may describe all paths between each client and the data storage system and the particular one or more LUNs visible through each such path. The techniques herein may then further provide for representing the complete set of information as a bidirectional graph which is cached for use in responding to client query requests. The complete set of information may have an organization and structure to facilitate retrieval of the information necessary to respond to client requests for information. It should be noted that the complete set of information needed to respond to any possible client query may vary with embodiment depending on the scope of client query requests possible.

The foregoing bulk query request may be performed at a first point in time such as prior to receiving any client requests (e.g., as part of an initialization process), or in response to the first client request, initiating the first client session, and the like. Once the complete set of information is obtained, it may be stored in the form of a bidirectional graph where the bidirectional graph may be stored in a portion of cache for fast retrieval and access at subsequent points in time for use in responding to client requests/queries.

Figure 3:
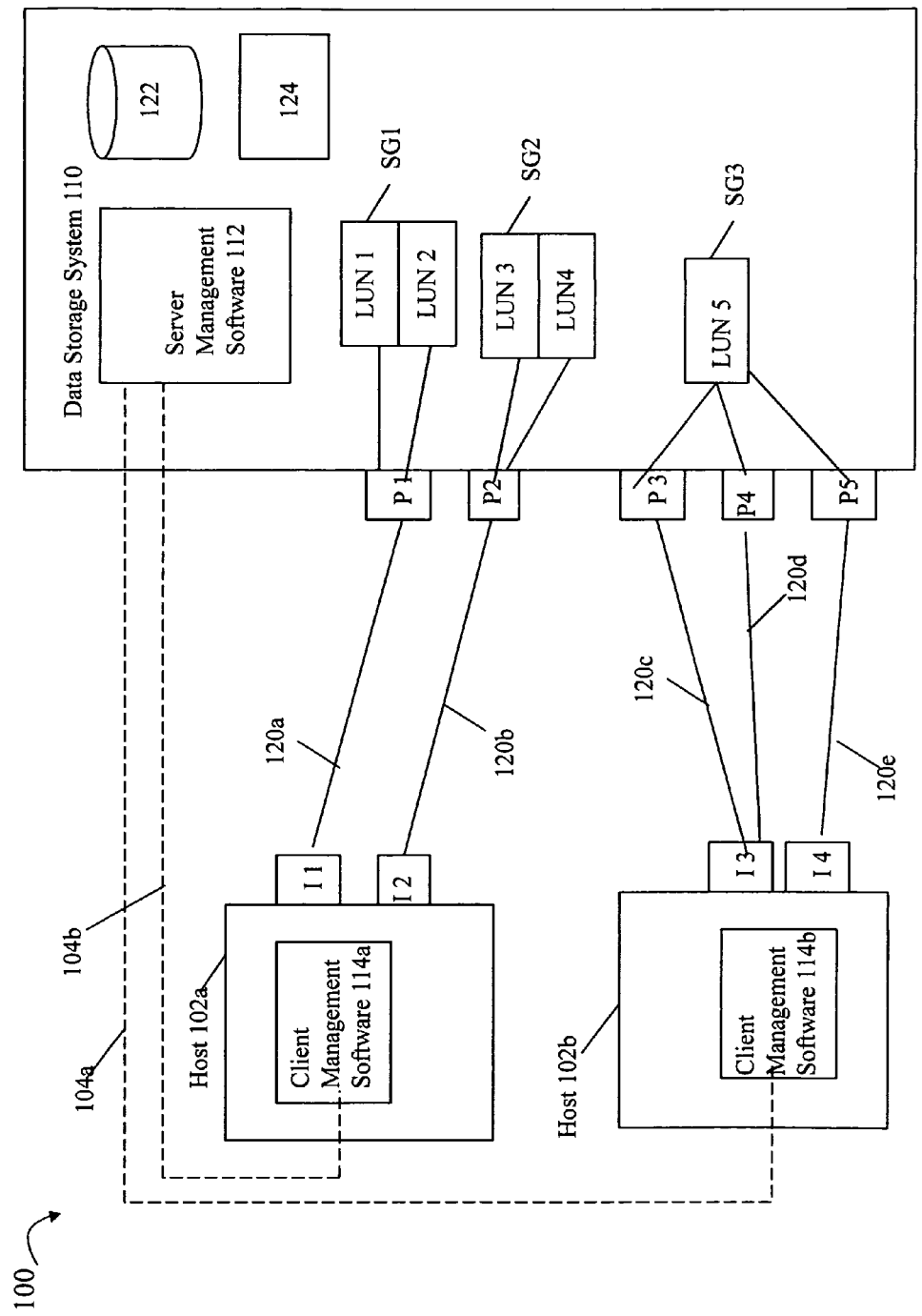
FIGS. 3 and 5 are examples illustrating components that may be included in an embodiment in accordance with techniques herein.

Referring to FIG. 3, shown is an example of components that may be used in an embodiment in accordance with techniques herein. The example 100 includes hosts 102a, 102b and data storage system 110. Each of the hosts 102a, 102b and data storage system 110 may include components as illustrated in FIG. 3 and may also include other components as described herein which have been omitted for simplicity of illustration. Also, only two hosts are shown as clients of the system 110 however an embodiment may include more generally any number of hosts or other entities as clients of the data storage system 110. Host 102a includes client management software 114a and initiator ports I1, I2. Host 102b includes client management software 114b and initiator posts I3, I4. The data storage system 110 includes server management software 112, target ports P1-P5 (e.g., P1, P2, P3, P4 and P5), LUNs 1-5 (e.g., LUN1, LUN2, LUN3, LUN4 and LUN 5) and SGs1-3 (e.g., SG1, SG2 and SG3). SG1 includes LUNs1-2. SG2 includes LUNs 3-4 and SG3 includes LUN5. The current topology or data storage system configuration includes 5 data paths 120a-120e over which various LUNs are accessible to different initiator ports of hosts 102a, 102b. Host 102a may access LUNs1-2 through a path including I1 and P1. Host 102a may access LUNs3-4 through a path including I2 and P2. Host 102b may access LUN 5 through a first path including I3 and P3, a second path including I3 and P4, and a third path including I4 and P5. The example 100 also includes control or management paths 104a, 104b over which the hosts 102a, 102b communicate with the data storage system to perform data storage system management. In connection with techniques herein, each of the hosts 102a, 102b may issue requests to the data storage system 110 for information as described herein related to generally data storage system management storage such as regarding storage provisioned for each host's use on the data storage system. Such requests from host 102a may be issued over the management or control path 104a between client management software 114a and server management software 112. Such requests from host 102b may be issued over the management or control path 104b between client management software 114b and server management software 112. It should be noted that the various control paths 104a, 104b and data paths 120a-120e may represent different logical paths between the illustrated components which may or may not be implemented using different physical connections and components.

The client management software 114a, 114b may use a defined API (application programming interface) when communicating with the server management software 112. The server management software 112 may include one or more service providers which may perform processing in connection with techniques herein. The server management software 112 may include code that, when executed, queries the data storage configuration database 122 to retrieve the above-mentioned complete set of information which is then processed by the server management software 112 and stored in the form of a bidirectional graph in a cache 124. The cache 124 may be implemented, for example, using a form of fast memory. The software 112 may also perform processing as described herein to utilize the cached bidirectional graph to determine requested information by a client and then communicate such requested information to the management software 114a or 114b on the requesting one of the clients (e.g., one of hosts 102a, 102b in this example).

As known in the art, a bidirectional graph G may be defined as including a first set of nodes or vertices V and a second set of edges E between pairs of the nodes or vertices. With the bidirectional graph, each node of the first set may represent an object in the first object model of the server, such as the data storage system. Each edge of the second set between a pair of nodes of the first set may represent an association between two objects corresponding to the pair of nodes. Additionally, the bidirectional graph has the property that if a first edge of the second set exists from a first node to a second node, the second set of edges also includes a second edge from the second node to the first node. In connection with the bidirectional graph representations herein, two edges between a pair of first and second nodes corresponding to the bidirectional property between the pair of nodes (e.g., where the two edges includes a first edge directed from a first node to a second node and a second edge directed from the second node to the first node) are represented collectively using a double-headed arrow between the pair of nodes.

Figure 4:
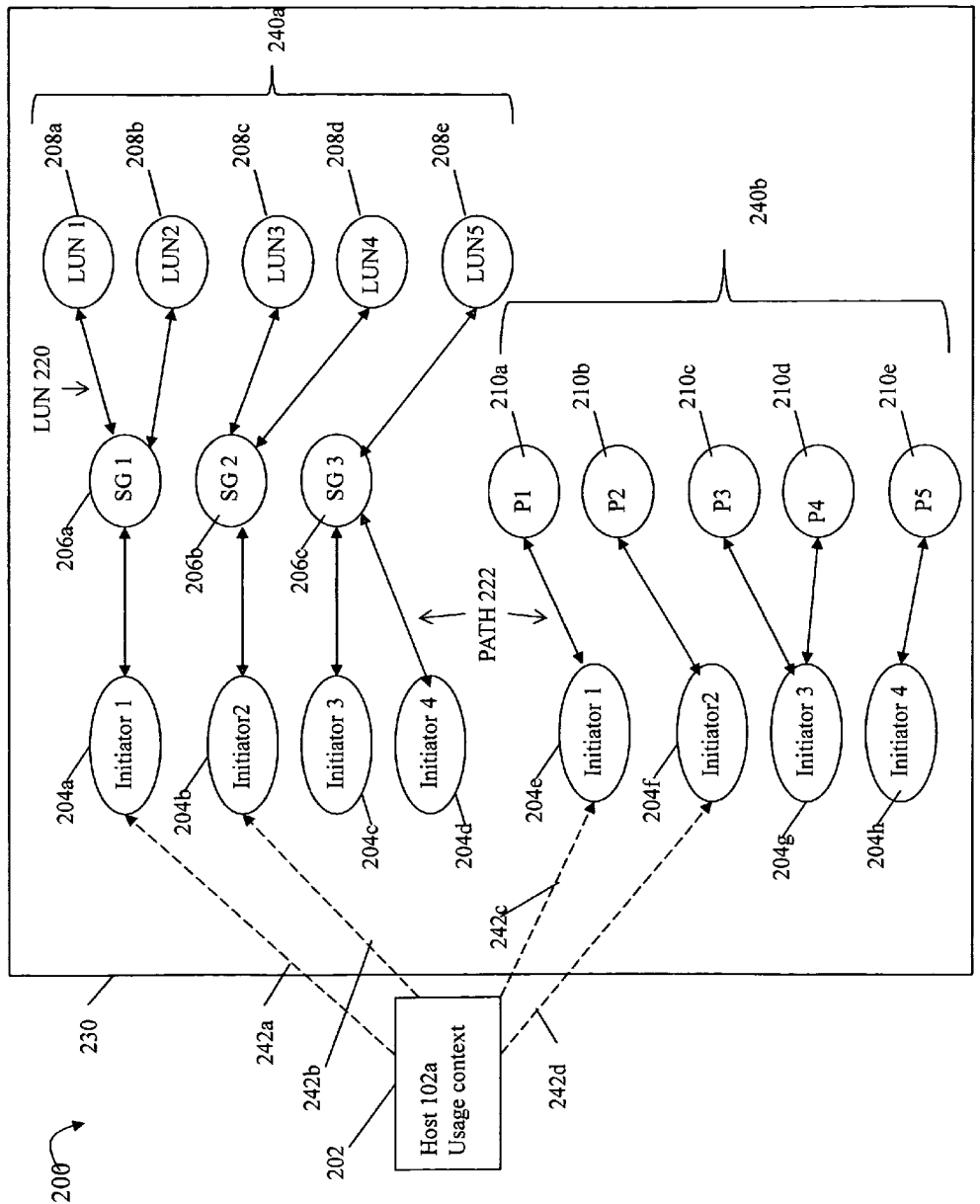
FIG. 4 is an example illustrating a bidirectional graph and usage context as may be used in an embodiment in accordance with techniques herein.

Referring to FIG. 4, shown is an example representing information that may be stored in a bidirectional graph and associated usage context in an embodiment in accordance with techniques herein. The example 200 includes a representation of a bidirectional graph in 230 as may be stored in cache after performing a bulk query to obtain a complete set of information characterizing the topology of the current data storage configuration as illustrated in FIG. 3. As noted elsewhere herein, the complete set of information may be used in connection with responding to any query from any host (client) of the data storage system (server) for this particular example. If the storage configuration is varied, or if the particular requests or queries possible from a host changes (e.g., modification to the client management API used in by client management software 114a, 114b), so will the complete set of information. The information of 230 may be included in the bidirectional graph which is stored in cache, for example, as part of an initialization or startup processing of the management software 112. The graph of 230 includes nodes 204a-204h representing host initiators, 206a-206c representing defined SGs, 208a-208e representing LUNs having storage currently provisioned, and 210a-210e representing target ports of the data storage system. The bidirectional arrows between pairs of the foregoing nodes represent bidirectional edges between pairs of the nodes. Each bidirectional arrow indicates an association between entities represented by connected pairs of nodes.

For the cached graph of 230 in this example, there may be a dependency upon two types of objects in the data storage system database model as described elsewhere herein. One of the types may include PATH objects 222 defining path object associations over which an SG is visible or accessible. Each PATH object 222 may identify an initiator (In, n being one of the initiators of one of the hosts), data storage system target port (Pm, m being one of the target ports of the data storage system) and SG (SGk, k being one of the defined storage groups) visible over the represented path. A PATH object 220 for a single path may be represented as In-Pm-SGk representing the path from an initiator In to target port Pm over which SGk is visible or accessible. A second object type of the database model upon which the cached bidirectional graph is dependent is LUN objects 220. A LUN object may be included in the database model of the storage system for each LUN where the object may also indicate to which SG the LUN belongs.

In this particular example, the data storage system database may be queried to obtain instances of PATH objects 222 and LUN objects 220. Additionally, the information described by the foregoing PATH and LUN objects may be further reorganized as illustrated in FIG. 4 where all instances of PATH objects (each describing an instance of the following: In-Pm-SGk) may be partitioned and cached as two sets of mapping information where a first set denotes all instances of In-Pm, and the second set of information denotes all instance of In-SGk. All instances of LUN objects may be retrieved and cached to represent a third set of mapping information between SGs and LUNs included in each SG. The foregoing first set of mapping information is represented by 240b and the foregoing second and third sets of mapping information may be combined as represented in 240a. The graph of 230 as just described may be generated as a result of performing database queries to obtain the complete set of information for the bidirectional graph and then reorganizing the information having a representation of 230 to facilitate traversal for responding to host queries.

The graph 230 includes information regarding all possible paths between all hosts 102a, 102b and the data storage system 110 and LUNs visible or exposed on each of these paths. The example 200 also includes a usage context 202 which may be characterized as a filter used with responding to a query for a particular host. The usage context 202 may be specified and used for the duration of a single session from one of the hosts 102a, 102b. More generally, the usage context 202 may used to filter information from the graph 230 from the perspective of a client, such as the host in order to define the view of the data storage system that the client's customized perspective. For a single host, the usage context 202 may include the initiator ports of the host used in connection with filtering information retrieved from the graph 230. In this example, element 202 represents the usage context for host 102a issuing a query to the data storage system. With reference back to FIG. 3, host 102a includes initiator ports I1 and I2 and dashed lines 242a-242d illustrate application of this usage context as a filter denoting which portions or branches of the graph are utilized in connection with retrieving information for responding to a query from host 102a.

In connection with keeping the cached bidirectional graph 230 up to date, the server management software 112 may register to receive indications regarding any change to objects of the database model of the data storage system upon which the cached bidirectional graph depends. In this example, the server management software may register to receive an indication regarding a change/modification to an existing PATH or LUN object (e.g., including a change to an object property or a change in an association between objects), addition of a new LUN or PATH object, and deletion of an existing LUN or PATH object. For example, the software 112 may be notified regarding adding or deleting a LUN with respect to a defined SG, creating a new SG, provisioning storage for a new LUN, deleting or adding a path, disconnecting a host, and the like. In response to receiving such indications regarding operations performed to the database, the server 230 may obtain relevant data updates from the database which may then be used to accordingly update and thereby maintain the graph 230 consistent with any data storage configuration changes.

In connection with the bidirectional graph 230, such bidirectional edges allow for traversal and querying in any denoted direction by the edges for a particular graph path including a set of nodes. For example, a graph path including nodes 204a, 206a and 208a may be traversed starting with node 208a then to 206a and then to 204a. The same graph path including nodes 204a, 206a and 208a may also be traversed in reverse ordering with respect to the foregoing, for example, starting with node 204a then to 206a and then to 208a. Either traversal may be used depending on the particular information to be obtained and the starting point of information provided. Furthermore, the graph may be traversed starting from any node in the graph. In an embodiment, each node of the graph may have a unique identifier and the embodiment may provide a mapping from the unique identifier to the address or location of the node in the cached graph representation. Thus, the bidirectional graph provides additional flexibility in connection with traversing connected nodes thereof where such connections correspond to edges representing associations between various entities of the data storage system configuration.

Additionally, the server management software 112 may provide indications to each client on a per session level based on changes to the cached bidirectional graph 230. The cached graph 230 includes the complete set of information that any client may ask or query about. In this way, when there is a change to the graph 230, each client may also be notified based on its particular usage context and may then request data regarding such changes.

In one embodiment, when client management software 114a, 114b of a respective one of the hosts 102a, 102b first initiates a session and connects to the data storage system, the host may perform a full query where the full query may request, for example, information on all paths from the host to the data storage system and information on all LUNs are accessible to the host through each such path. In this manner, the information provided to the requesting host may be filtered based on the host's usage context including the initiator ports of the host. Subsequently, the host may periodically request (e.g., via polling the data storage system) and obtain updated information regarding what has been added, modified and/or deleted since the last request. In this manner, the host may obtain an initial set of information regarding its data storage configuration and may accordingly obtain updates to data storage configuration information of interest to the host thereby allowing the host to maintain an up to date set of a relevant portion of the data storage configuration information.

Referring back to FIG. 4 to further illustrate use of the techniques herein, the host 102a may query the data storage system to obtain a report on what LUNs are visible to the host 102a (e.g., from any port of the host 102a based on host 102a's usage context including I1 and I2). In response, the data storage system may traverse portions of the graph indicated by arrows 242a and 242b. In particular, the graph may be traversed from 204a to node 206a, and then from 206a to both 208a and 208b thereby determining that LUNS 1 and 2 are accessible to host 102a. In a similar manner, the graph may also be traversed from 204b to node 206b, and then from 206b to both 208c and 208d thereby determining that LUNS 3 and 4 are accessible to host 102a. In response to the foregoing host query, the server management software 112 may provide a list of LUNs1-4.

As another example, the host 102a may query the data storage system 110 to identify all LUNs accessible through target data storage system port 1, P1 in accordance with usage context 202 for host 102a. With reference to FIG. 4, the graph portion 240b may be first utilized to determine which initiators can access storage LUNs using P1. In this case, 240b indicates that initiator 1 204e can access storage LUNs using P1 210a (e.g., traverse 240b along graph paths originating from 242c and 242d to determine which such graph paths include P1. The initiator(s) are those included on these identified graph paths.) As a second step, the top portion 240a of the graph 230 may then be used to determine what LUNs are exposed for each initiator identified in 240b. In this example, 240a is traversed along graph paths originating from 242a for the initiator I1 204a to determine the LUNs included on such graph paths. In this example, the identified LUNs are LUNs1-2 represented, respectively, by nodes 208a, 208b.

Figure 5:
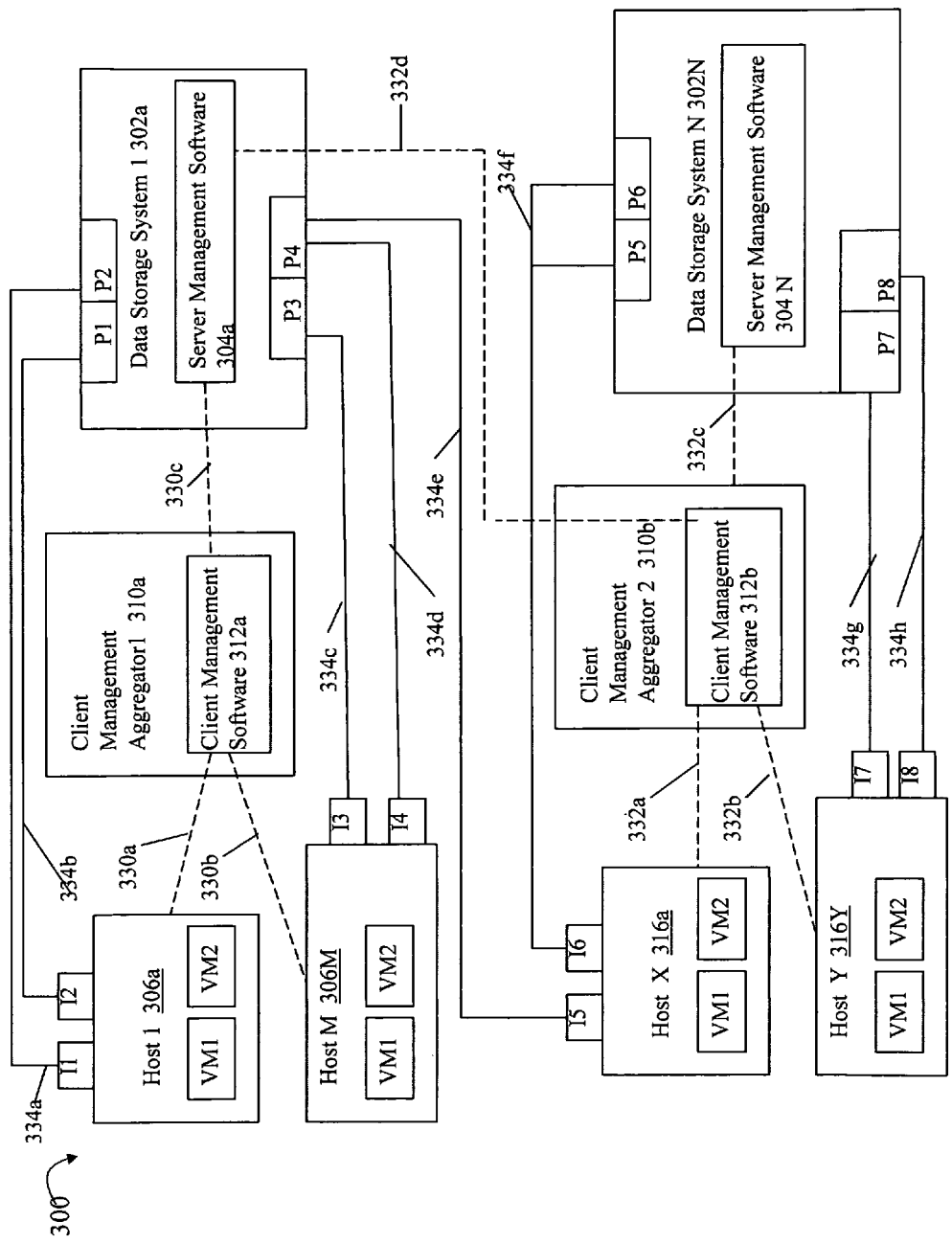

With reference now to FIG. 5, shown is another example an embodiment which may utilize techniques described herein. In the example 300, included are hosts 306a, 306M, hosts 316a,316Y, client management aggregators 310a, 310b, and data storage systems 302a,302N.

Initiator ports of the hosts are denoted as I1-I8. Target ports of the data storage systems are denoted as P1-P8. Solid lines 334a-334h denote data paths used for transmitting I/O operations or data requests and requested data between connected components (e.g., between a host and a data storage system). Dashed lines 330a-330c, and 332a-332d denote management or control paths between aggregator 310a and hosts 306a, 306M, between aggregator 310a and data storage system 302a, between aggregator 310b and hosts 316a, 316Y, between aggregator 310b and data storage system 302a and between aggregator 310b and data storage system N.

Each of the hosts and data storage systems may be as described elsewhere herein with the difference that the hosts 306a, 306M and the hosts 316a,316Y may each not include client management software as described elsewhere herein and each such host may also provide a virtualized environment including one or more virtual machines (VMs) for executing applications on each such host. Each VM may have an application executing in the context of the VM where the application's data is stored on provisioned storage devices of one or more of data storage systems 302a,302N. Each of the hosts 306a,306M and the hosts 316a,316Y may include a hypervisor that performs VM management in connection with multiple VMs such as VMware ESX Server by VMware, Inc. Such a hypervisor, or more generally, VM manager, of each host having VMs executing therein may be installed and run directly on host hardware without requiring an underlying operating system. Each of the VM managers may perform management of the underlying host's physical resources for use among the multiple VMs that can run simultaneously.

Each of the client management aggregators 310a, 312b may function as host management aggregators or centers providing data storage management for a plurality of hosts or, more generally clients of the data storage system. For example, aggregator 310a may be used to perform data storage management and configuration for hosts 306a,306M connected to 310a over various management or control paths 330a, 330b. In a similar manner, aggregator 310b may be used to perform data storage management and configuration for hosts 316a,316Y connected to 310b over various management or control paths 332a, 332b. Each of 310a, 310b may include software thereon for performing such management for multiple hosts running virtualized environments as illustrated. For example, each of 310a, 310b may include VMware vCenter™ Server software that provides for a central, scalable and extensible platform for virtualization management of multiple virtualized hosts. In connection with techniques herein, each of the aggregators 310a, 310b may include, respectively, client management software 312a, 312b. Thus, the aggregators 310a, 310b may function as an intermediate component between the virtualized hosts and the data storage systems. In this manner, aggregator 310a may communicate with data storage system 302a and hosts 306a,306M where system 302a has storage provisioned thereon for use by the hosts 306a,306M. Similarly, aggregator 310b may communicate with data storage systems 302a,302N and hosts 316a, 316Y where systems 302a, 302N have storage provisioned thereon for use by the hosts 316a,316Y.

Generally, each aggregator 310a, 310b may perform management for one or more hosts where each such host may have one or more initiator ports included in data paths to one or more data storage systems 302a, 302N. In a manner similar to that as described elsewhere herein for a single host, an aggregator may perform management for one or more hosts and may therefore include client management software to perform processing as described herein with a usage context representing a collective or aggregate usage context for the one or more hosts being managed by the aggregator. Aggregator 310a may define its usage context as all objects related to a set of host initiators where the set is the collective or aggregate of all initiator ports for hosts managed by aggregator 310a. Aggregator 310b may define its usage context as all objects related to a set of host initiators where the set is the collective or aggregate of all initiator ports for hosts managed by aggregator 310b. To further illustrate, aggregator 310a is performing data storage configuration management for hosts 306a, 306M and may have a usage context identifying initiator ports I1-I4. Aggregator 310b is performing data storage configuration management for hosts 316a, 316Y and may have a usage context identifying initiator ports I5-I8. In this example, data storage system 302a has a single client aggregator 310a and data storage system 302N has two client aggregators 310a, 310b. Each aggregator may report data storage configuration information on the topology and health from the context or viewpoint of the hosts said aggregator is managing. Each of 310a, 310b may be a separate server system having a management console connected thereto upon which information may be displayed based on each aggregator's usage context. Each aggregator 310a, 310b may use such a view or context for reporting storage provisioned for use by any of its managed hosts, reporting on a status or health of components in paths used to access provisioned storage, and the like. The number of hosts of each aggregator 310a, 310b may generally be any number of hosts where each such aggregator 310a, 310b may perform management for a different number of such hosts. In connection with FIG. 5, and more generally any of the examples and figures described herein, the particular number of components (e.g., number of hosts, number of aggregators, number of data storage systems, etc.) is for purposes of illustration and should not be construed as applying a limit to an embodiment in accordance with techniques herein.

It should be noted that the health and/or status information and data storage configuration information may be used by the aggregators 310a, 310b of FIG. 5 or by individual hosts 102a, 102b of FIG. 3 in performing different tasks. For example, one such task may be determining whether there are multiple data paths over which a single host may access a LUN so if a component of the host or data storage system of a current path fails thereby making the LUN inaccessible over the current path, an alternate path may be used to access the LUN.

As a further variation to the embodiment illustrated in FIG. 5, an embodiment may have hosts which do not provide virtualized environments and in such an embodiment each of 310a, 310b may be more generally described as performing aggregate management of multiple hosts where such hosts may or may not provide virtualized or other types of environments. Furthermore, with reference back to FIG. 3, some embodiments may have a single host such as 102a, 102b also provide a virtualized environment.

Described above are techniques for use with caching a bidirectional graph that may be used in connection with reporting on views of storage provisioned for one or more clients. In one embodiment such as illustrated in FIG. 5, an aggregator acting as a virtual data center manager client may require a separate view or usage context for reporting storage provisioned for its use based on a set of managed hosts providing virtualized environments. Each client of the data storage system performing data storage system management, where the client may be a single host (e.g., see FIG. 3) or an aggregator (e.g., see FIG. 5) may define its usage context as all objects connected with a set of host initiators. Each data storage system may provide support for multiple aggregators or hosts and sessions where reports for each such session are based on the particular client sessions usage context (e.g., thereby reporting only with respect to the host and data storage system ports and LUNs for the usage context). In connection with techniques herein, bulk queries may be utilized to obtain an initial complete set of information including all objects and associations between the objects needed to respond to any query from a client. Such complete information may be stored in a cache and represented as a bidirectional graph that supports efficient searches to generate multiple usage context sets as required by the clients. The server management software, more generally as a provider of services described herein, may register for indications to be notified of changes in the associations and objects of the database upon which the bidirectional graph is dependent thereby allowing for easy updates to the cached bidirectional graph. As described herein, the bidirectional graph may be generally updated in response to any of a change, deletion or addition with respect to an object in the first data model of the database upon which the bidirectional graph is dependent. Updating the bidirectional graph may include updating information about an existing node in the bidirectional graph, deleting an existing node from the bidirectional graph, adding a new node to the bidirectional graph, and adding or deleting an association between nodes of the bidirectional graph.

Figure 6:
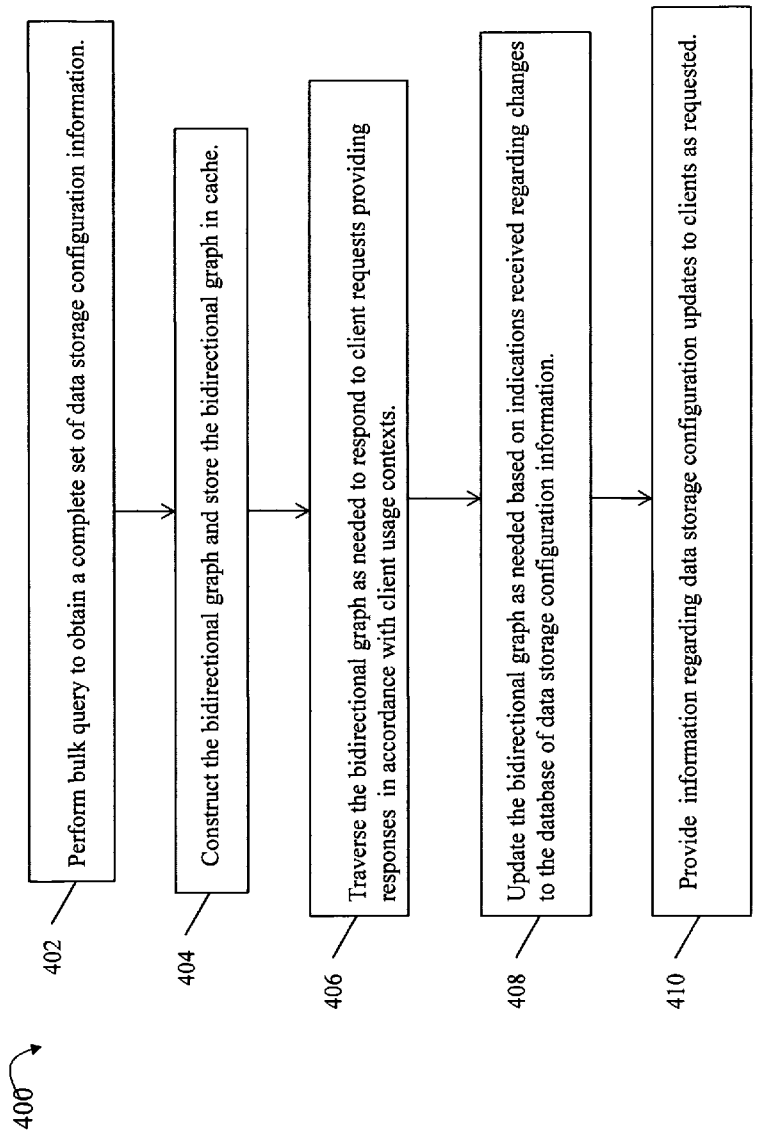
FIG. 6 is a flowchart of processing steps that may be performed in an embodiment in accordance with techniques herein.

Referring to FIG. 6, shown is a flowchart of processing steps as may be performed in an embodiment in accordance with techniques herein. The flowchart 400 summarizes processing described above as may be performed in an embodiment utilizing techniques herein. At step 402, a bulk query may be performed to obtain a complete set of data storage configuration information. At step 404, the bidirectional graph may be constructed from the complete set of data storage configuration information and the graph may be stored in cache. In step 406, the bidirectional graph may be traversed as needed in connection with responding to client requests in accordance with client usage contexts. At step 408, the bidirectional graph may be updated as needed in response to indications received regarding changes to the database of data storage configuration. Step 408 may be performed as a background task that runs in parallel to the other illustrated steps thereby indicating that the cache may be maintained in the background while allowing client requests to be serviced efficiently. The client requests may be characterized as arriving at the data storage system independently of any configuration changes affecting the database of the data storage system (e.g., where such changes to the database cause updates to the cache). At step 410, information regarding data storage configuration updates may be provided to the clients as requested based on changes made to the cached bidirectional graph.

An embodiment may implement the techniques herein using code executed by a processor. For example, an embodiment may implement the techniques herein using code which is executed by a processor of the data storage system, management system, or more generally, any computer system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for reporting requested information to a client comprising:
    querying a database to retrieve a first set of database path objects and a second set of database storage device objects, each of the database path objects of the first set identifying an initiator port, a target port and a storage group of one or more storage devices visible over a path represented by said each database path object, each of the database storage objects of the second set identifying a storage device represented by said each database storage object and a storage group to which the storage device represented belongs;
    partitioning said first set of database path objects into first and second sets of mapping information, said first set of mapping information identifying all initiator port to target port mappings as included in the first set of database path objects, said second set of mapping information identifying all initiator port to storage group mappings as included in the first set of database path objects;
    determining a combined representation by combining the second set of mapping information with a third set of mapping information, wherein said third set of mapping information identifies mappings between each storage group and one or more storage devices included in said each storage group as identified by said second set of database storage device objects;
    storing a bidirectional graph in a cache, the bidirectional graph comprising a first set of nodes and a second set of edges between pairs of nodes of the first set, each node of the first set representing an object in an object model of a server that is a data storage system including storage devices with storage provisioned for use by the client, each edge of the second set between a pair of nodes of the first set representing an association between two objects corresponding to the pair of nodes, wherein if a first edge of the second set is from a first node to a second node, the second set also includes a second edge from the second node to the first node, wherein said bidirectional graph includes a first portion representing said combined representation and wherein said bidirectional graph includes a second portion representing the first set of mapping information;
    receiving, at the data storage system, a request from the client, wherein said client is an aggregator providing data storage management for a plurality of hosts and said aggregator is an intermediate component between the plurality of hosts and the data storage system; and
    determining a response to the request, wherein said determining the response includes:
        traversing a portion of the bidirectional graph to extract first information; and
        filtering the first information in accordance with a usage context customized for the client.

2. The method of claim 1, wherein the bidirectional graph is initially stored in the cache at a first point in time by performing said querying which includes performing a bulk query of the database to retrieve information identifying all occurrences of paths between the server and a plurality of clients providing access to storage devices and all occurrences of defined storage groups of storage devices accessible by the plurality of clients, said client being one of the plurality of clients.

3. The method of claim 2, wherein the database stores information about a topology of a data storage configuration including the plurality of clients and the server, wherein the server is the data storage system comprising a plurality of storage devices including storage provisioned for the plurality of clients.

4. The method of claim 3, wherein the request from the client is a request for information about storage of the data storage system provisioned for the client.

5. The method of claim 4, wherein the client is first of the plurality of clients and a second of the plurality of clients is a host system providing a virtualized environment and having a plurality of virtual machines executing on the host system, the plurality of virtual machines having applications executing thereon which have application data stored on provisioned storage of storage devices of the data storage system.

6. The method of claim 4, wherein the client is the aggregator providing collective data storage management for the plurality of hosts, each of the plurality of hosts providing a virtualized environment and having one or more virtual machines executing on said each host, each of the one or more virtual machines having an application executing in the context of said each virtual machine wherein the application has its application data stored on provisioned storage of storage devices of the data storage system.

7. The method of claim 6, wherein the usage context for the client which is the aggregator includes a set of initiator ports of the plurality of hosts managed by the aggregator.

8. The method of claim 7, wherein the hulk query of the database includes retrieving a path set of all paths between the plurality of clients and the data storage system, wherein each of said initiator ports of the client are included in at least one of the paths of the path set and each of the paths in the path set represents a path over which provisioned storage is accessible for at least one of the plurality of clients.

9. The method of claim 8, wherein the data storage system uses a first data model to represent information which describes the topology and which is stored in the database, the first data model being different from a second data model used by the client, and wherein the request from the client is requesting information on storage provisioned for the client.

10. The method of claim 9, wherein each of the paths in the path set over which provisioned storage is accessible by at least one of the plurality of clients is identified by a plurality of associated objects of the first data model, the associated objects including objects representing an initiator port of a first of the plurality of clients, a target port of the data storage system, and a storage group including a set of one or more storage devices, wherein storage devices included in the storage group and included in the data storage system are accessible over said each path by the first client.

11. The method of claim 10, wherein the data storage system includes a provider service using the bidirectional graph stored in the cache to determine the response for the request from the client, wherein said filtering includes applying the usage context for the client to determine a portion of the first information associated with any port of the set of initiator ports of the client.

12. The method of claim 11, wherein the request from the client is for a list of storage devices accessible to the client through a target port set of one or more target ports of the data storage system, and the response to the request identifies the storage devices accessible to the client on a path including any initiator port of the set of initiator ports of the client and any target port of the target port set.

13. The method of claim 1, wherein the bidirectional graph is traversed from a first node to a second node and from the second node to a third node when performing a first traversal for a first client request, and traversed from the third node to the second node and from the second node to the first node when performing a second traversal for a second client request.

14. The method of claim 9, therein the bidirectional graph is updated in response to operations modifying objects of the first data model of the database upon which information represented in the bidirectional graph is dependent.

15. The method of claim 14, wherein the bidirectional graph is updated in response to any of a change, deletion or addition with respect to an object in the first data model upon which the bidirectional graph is dependent.

16. The method of claim 15, wherein updating the bidirectional graph includes any of updating information about an existing node in the bidirectional graph, deleting an existing node from the bidirectional graph, adding a new node to the bidirectional graph, and adding or deleting an association between nodes of the bidirectional graph.

17. The method of claim 1, further comprising sending the response to the client.

18. A non-transitory computer readable medium comprising code stored thereon for reporting requested information to a client, the non-transitory computer readable medium comprising code for:
  querying a database to retrieve a first set of database path objects and a second set of database storage device objects, each of the database path objects of the first set identifying an initiator port, a target port and a storage group of one or more storage devices visible over a path represented by said each database path object, each of the database storage objects of the second set identifying a storage device represented by said each database storage object and a storage group to which the storage device represented belongs;
  partitioning said first set of database path objects into first and second sets of mapping information, said first set of mapping information identifying all initiator port to target port mappings as included in the first set of database path objects, said second set of mapping information identifying all initiator port to storage group mappings as included in the first set of database path objects;
  determining a combined representation by combining the second set of mapping information with a third set of mapping information, wherein said third set of mapping information identifies mappings between each storage group and one or more storage devices included in said each storage group as identified by said second set of database storage device objects;
  storing a bidirectional graph in a cache, the bidirectional graph comprising a first set of nodes and a second set of edges between pairs of nodes of the first set, each node of the first set representing an object in an object model of a server that is a data storage system including storage devices with storage provisioned for use by the client, each edge of the second set between a pair of nodes of the first set representing an association between two objects corresponding to the pair of nodes, wherein if a first edge of the second set is from a first node to a second node, the second set also includes a second edge from the second node to the first node, wherein said bidirectional graph includes a first portion representing said combined representation and wherein said bidirectional graph includes a second portion representing the first set of mapping information;
  receiving, at the data storage system, a request from the client, wherein said client is an aggregator providing data storage management for a plurality of hosts and said aggregator is an intermediate component between the plurality of hosts and the data storage system; and
  determining a response to the request, wherein said determining the response includes:
    traversing a portion of the bidirectional graph to extract first information; and
    filtering the first information in accordance with a usage context customized for the client.

19. The non-transitory computer readable medium of claim 18, wherein the bidirectional graph is initially stored in the cache at a first point in time by performing said querying which includes performing a bulk query of the database to retrieve information identifying all occurrences of paths between the server and a plurality of clients providing access to storage devices and all occurrences of defined storage groups of storage devices accessible by the plurality of clients, said client being one of the plurality of clients.

20. The non-transitory computer readable medium of claim 19, wherein the database stores information about a topology of a data storage configuration including the plurality of clients and the server, wherein the server is the data storage system comprising a plurality of storage devices including storage provisioned for the plurality of clients and wherein the request from the client is a request for information about storage of the data storage system provisioned for the client.

* * * * *